(12) United States Patent
Joyner

(10) Patent No.: US 9,259,111 B1
(45) Date of Patent: Feb. 16, 2016

(54) CHOPSTICKS HAVING ELEVATING RADIAL PROTRUSION FOR PREVENTING GERMS AND CONTAMINATION

(71) Applicant: Michael Joyner, Delray Beach, FL (US)

(72) Inventor: Michael Joyner, Delray Beach, FL (US)

(73) Assignee: Bly Management Limited Partnership, Boca Raton, FL (US)

(*) Notice: Subject to any disclaimer, the term of this patent is extended or adjusted under 35 U.S.C. 154(b) by 0 days.

(21) Appl. No.: 14/323,835

(22) Filed: Jul. 3, 2014

Related U.S. Application Data

(63) Continuation-in-part of application No. 13/423,835, filed on Mar. 19, 2012, now Pat. No. 8,769,832.

(60) Provisional application No. 61/454,267, filed on Mar. 18, 2011.

(51) Int. Cl.
*A47G 21/10* (2006.01)
*A47G 21/06* (2006.01)

(52) U.S. Cl.
CPC ..................... *A47G 21/103* (2013.01)

(58) Field of Classification Search
USPC ............... 294/218, 99.1, 5.5, 8.5, 16, 99.2; 30/142, 143, 151; D7/642, 645
See application file for complete search history.

(56) References Cited

U.S. PATENT DOCUMENTS

| | | | | |
|---|---|---|---|---|
| 2,789,349 A | * | 4/1957 | Lee | 30/298.4 |
| 3,239,262 A | * | 3/1966 | Rines et al. | 294/99.2 |
| D318,990 S | * | 8/1991 | Giugiaro | D7/691 |
| 5,697,659 A | * | 12/1997 | Calagui | 294/99.2 |
| 5,890,223 A | * | 4/1999 | Klemmer | 30/150 |
| D592,019 S | * | 5/2009 | Holcomb et al. | D7/643 |
| 2007/0187962 A1 | * | 8/2007 | Park | 294/99.2 |
| 2011/0169284 A1 | * | 7/2011 | Rosen | G09F 23/08 294/218 |
| 2013/0133206 A1 | * | 5/2013 | Donovan | A47G 21/02 30/298.4 |

FOREIGN PATENT DOCUMENTS

| | | | | |
|---|---|---|---|---|
| FR | 002610501 | * | 8/1988 | A47G 21/10 |
| JP | 2000-201792 | * | 7/2000 | A47G 21/10 |
| JP | 2003-280517 | * | 10/2003 | G09B 19/24 |

* cited by examiner

*Primary Examiner* — Paul T Chin
(74) *Attorney, Agent, or Firm* — H. John Rizvi; Gold & Rizvi P.A.

(57) ABSTRACT

A pair of chopsticks is disclosed, the chopsticks consisting of an elongated body having a proximal end to be gripped by a user, and a distal end to be used for seizing a food portion. The chopsticks include a protruding element, such as a disc-shaped collar, extending radially outward from the chopstick elongated body. The protruding element is arranged closer to the eating distal end than to the gripping proximal end. Thus, when the chopsticks are set on a horizontal surface, the chopsticks rest on the proximal end and the protruding element, while the eating distal end remains elevated and separated from the surface, thereby preventing contamination of the eating distal end. The protruding element of each chopstick can be arranged at a different distance from its respective eating distal end, in order to minimize interference between the two protruding elements.

16 Claims, 4 Drawing Sheets

CHOPSTICKS HAVING ELEVATING RADIAL PROTRUSION FOR PREVENTING GERMS AND CONTAMINATION

CROSS-REFERENCE TO RELATED APPLICATIONS

The present application claims the benefit of U.S. Non-Provisional patent application Ser. No. 13/423,835, filed Mar. 19, 2012, which is a Continuation-In-Part claiming the benefit of U.S. Provisional Patent Application Ser. No. 61/454,267, filed Mar. 18, 2011, all of which are incorporated herein in their entirety.

FIELD OF THE INVENTION

The present invention relates generally to utensils. More particularly, the present disclosure relates to eating utensils including a support configuration adapted for elevating the eating utensil above a surface to avoid contamination. More particularly, the present disclosure relates to a pair of chopsticks having a distal radial protrusion adapted for elevating the chopstick distal eating end when resting the chopstick on a surface.

BACKGROUND OF THE INVENTION

Chopsticks serve as the principal eating utensil in China, Japan, Taiwan, and other Asian countries, and are being increasingly used worldwide, particularly for eating Asian food. Normally, chopsticks consist in pairs of identical sticks shaped and sized to be handheld, and more particularly to be operated by the thumb, main and index fingers in order to seize portions of food. The sticks are generally sleek and simple in shape, and made of wood, plastic or metal. Certain chopsticks are tapered in order to provide a thicker proximal end gripping portion and a thinner distal eating end.

While chopsticks constitute a convenient, clean, and enjoyable eating utensil, they also present certain drawbacks. Mainly, when rested on a table or other eating surface, chopsticks greatly contact the surface and can potentially become contaminated. Many surfaces are dirty, and include contaminants, germs and bacteria if not washed regularly. As a result, a contaminated eating utensil can pose a health risk to the user. To safely reduce or eliminate germs and bacteria that may have contaminated the distal operating end of the chopstick eating utensil, the utensil must be repeatedly washed after coming into contact with a surface.

To address this concern, a solution consisting in an auxiliary chopstick rest has been developed to provide an elevated surface on which to support the chopstick distal eating ends, preventing the chopstick distal eating ends from contacting the table or surface. However, such as solution is not completely effective. In practice, chopsticks tend to roll out or fall off the chopstick rest and eventually impact the table or surface. Chopstick rests are also normally lightweight and unstable, and can be easily pushed out from underneath the chopstick distal eating ends, again causing the eating ends to fall and contact the table or surface.

Accordingly, there remains a need in the art to provide an effective yet convenient system for preventing chopstick contamination when resting a pair of chopsticks on a table or surface.

SUMMARY OF THE INVENTION

The present invention overcomes the deficiencies of the known art and the problems that remain unsolved by providing a pair of chopsticks, the chopsticks consisting of an elongated body incorporating a protruding element that elevates the chopstick eating or operational end when the chopstick is set on a table or the like. More specifically, the chopsticks consist of an elongated body including a proximal end to be gripped by a user and a distal end to be used for seizing a food portion. The chopsticks further include a protruding element, such as a disc-shaped collar, extending radially outward from the chopstick elongated body. The protruding element is arranged closer to the eating distal end than to the gripping proximal end. Thus, when the chopsticks are set on a horizontal surface, chopsticks are automatically positioned, by the effect of gravity, to rest on the protruding element and the proximal end.

In accordance with one embodiment of the present invention, the invention consists of a chopstick comprising:

an elongated body arranged along a longitudinal axis, said body comprising a proximal end, a distal end and an exterior surface; and a protruding element, protruding radially form said elongated body exterior surface, said protruding element being arranged closer to said elongated body distal end than to said elongated body proximal end.

In a second aspect, the protruding element is integrally formed with the elongated body, providing a cost effective solution that is easy to operate, store, or transport.

In another aspect, the protruding element is arranged around a perimeter of the elongated body exterior surface, allowing the chopstick distal end to be elevated from a surface regardless of the rotational position in which the chopstick is placed on the surface.

In another aspect, the protruding element is rotationally symmetrical relative to the elongated body longitudinal axis, allowing the chopstick to transversely roll on the protruding element.

In another aspect, the protruding element is a disc-shaped collar concentric to said elongated body longitudinal axis, minimizing the longitudinal dimension of the protruding element and maximizing the useful eating and gripping portions of the chopstick.

In another aspect, the protruding element has a radial dimension that is greater than a maximum radial dimension of the elongated body, allowing the chopstick elongated body distal end, and thus the eating portion, to be elevated away from the surface, i.e., at a rising angle from the surface, maximizing the clearance between the eating portion and the surface.

Introducing another embodiment of the invention, the present invention consists of a manufactured article comprising:

at least one chopstick having
an elongated body arranged along a longitudinal axis, said body comprising a proximal end, a distal end and an exterior surface; and
a protruding element, protruding radially form said elongated body exterior surface, said protruding element being arranged closer to said elongated body distal end than to said elongated body proximal end.

Introducing yet another embodiment of the invention, the present invention consists of a pair of chopsticks, comprising:

a first chopstick and a second chopstick, each comprising
an elongated body arranged along a longitudinal axis, said body comprising a proximal end, a distal end and an exterior surface; and
a protruding element, protruding radially form said elongated body exterior surface, said protruding element being arranged closer to said elongated body distal end than to said elongated body proximal end.

In a second aspect, the first chopstick protruding element is arranged at a first distance from said first chopstick elongated body distal end, and the second chopstick protruding element is arranged at a second distance from said second chopstick elongated body distal end, said first distance being greater than said second distance, thereby preventing transverse interference between the protruding elements when the chopsticks are set side-by-side on a surface or used as an eating utensil.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An exemplary embodiment of the invention is shown in various configurations in FIGS. 1 through 5 included herein.

Figure 1:
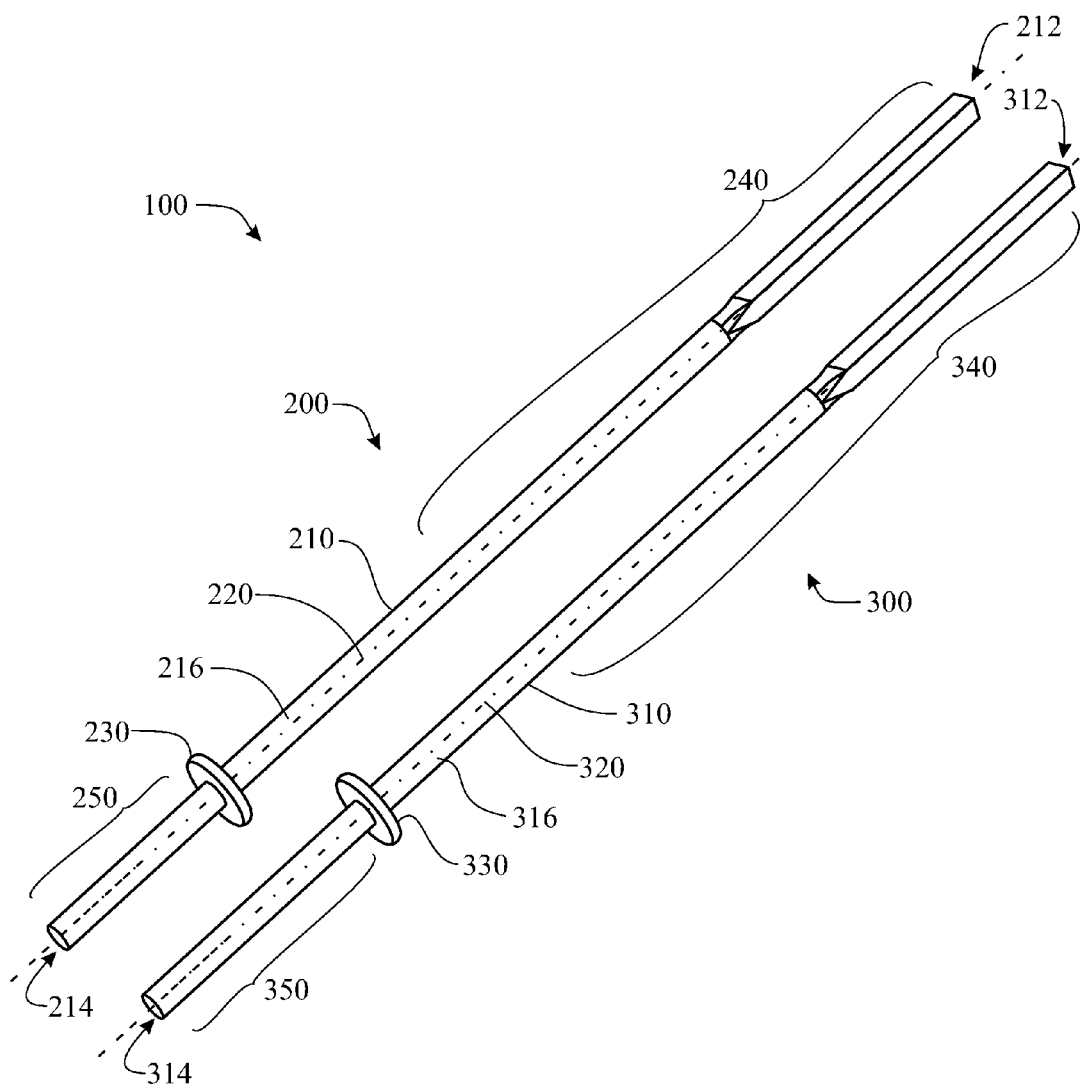
FIG. 1 presents an isometric view of an exemplary embodiment of a pair of chopsticks in accordance with the invention.
Figure 2:
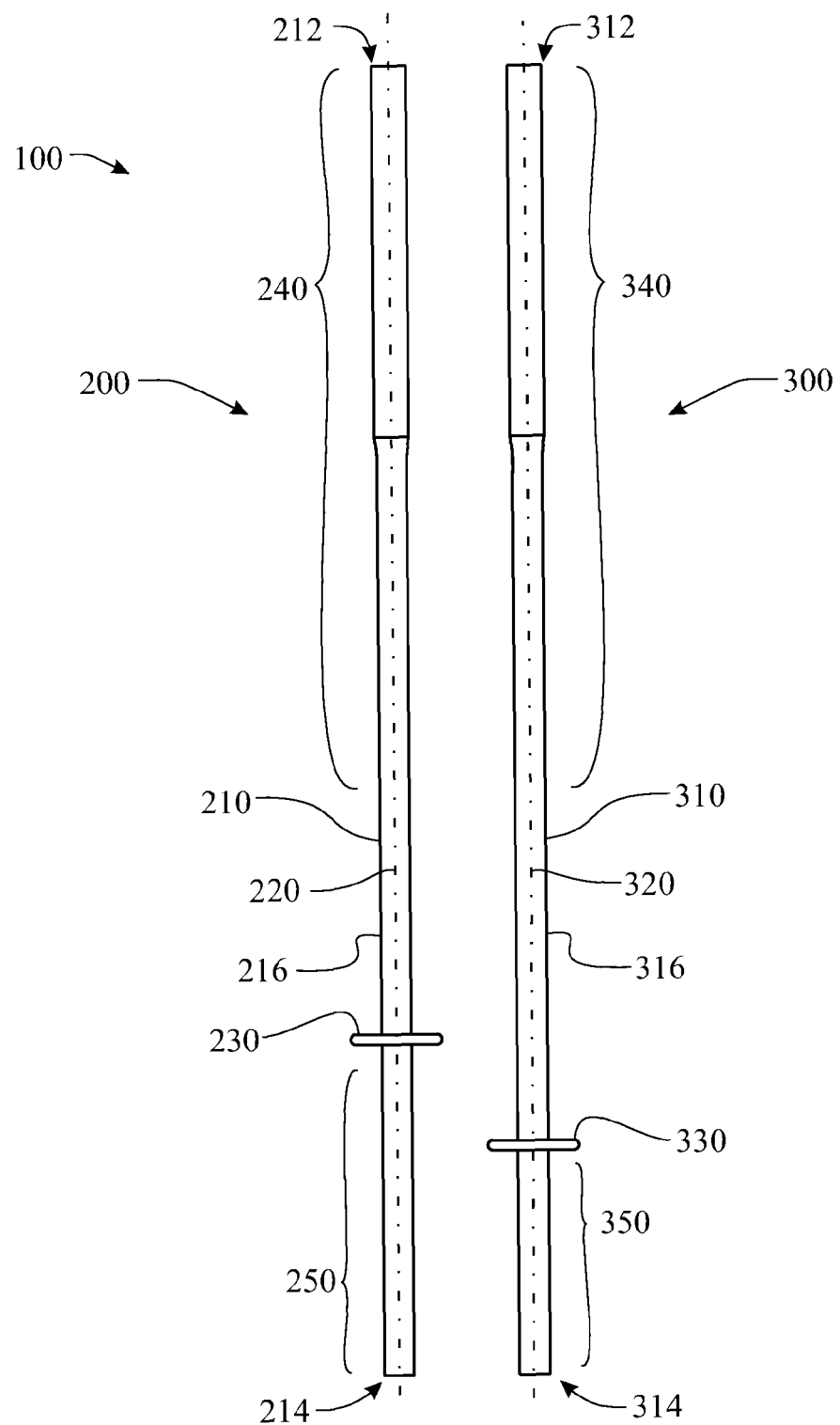
FIG. 2 presents a top elevation view of the pair of chopsticks of FIG. 1.

Referring initially to FIGS. 1 and 2, an exemplary pair of chopsticks 100 in accordance with the invention is shown, the pair of chopsticks comprising a first chopstick 200 and a second chopstick 300. The first chopstick 200 includes an elongated body 210 arranged along a longitudinal axis 220. The first chopstick elongated body 210 has a proximal end 212, a distal end 214 and an exterior surface 216. Similarly, the second chopstick 300 includes an elongated body 310 arranged along a longitudinal axis 320. The second chopstick elongated body 310 has a proximal end 312, a distal end 314 and an exterior surface 316. The elongated bodies 210, 310 are generally made of bamboo, wood, or plastic.

In accordance with the invention, the first chopstick 200 further comprises a single protruding element 230 that protrudes radially form the exterior surface 216 of the first chopstick elongated body 210. Similarly, the second chopstick 300 comprises a single protruding element 330 that protrudes radially form the exterior surface 316 of the second chopstick elongated body 310. As best shown in FIG. 2, both protruding elements 230, 330 are arranged longitudinally closer to the respective elongated body distal end 214, 314 than to the respective elongated body proximal end 212, 312.

Figure 3:
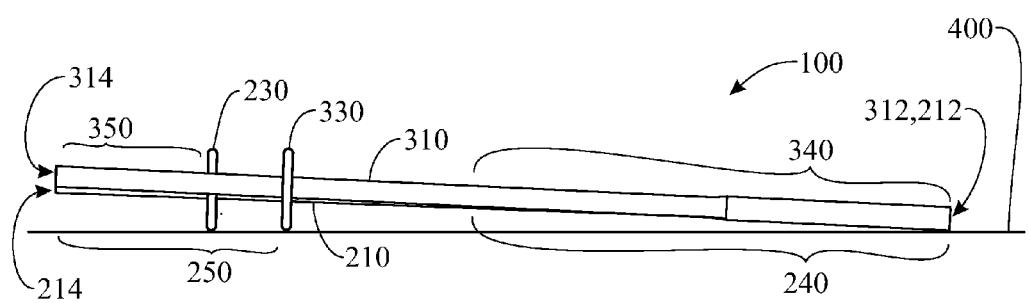
FIG. 3 presents a side elevation view of the pair of chopsticks of FIG. 1, resting on a horizontal surface.
Figure 4:
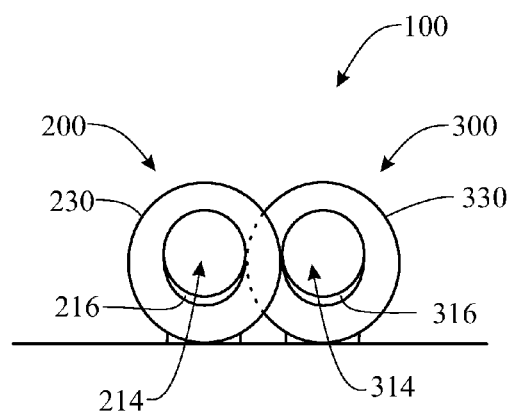
FIG. 4 presents a front elevation view of the pair of chopsticks of FIG. 3.
Figure 5:
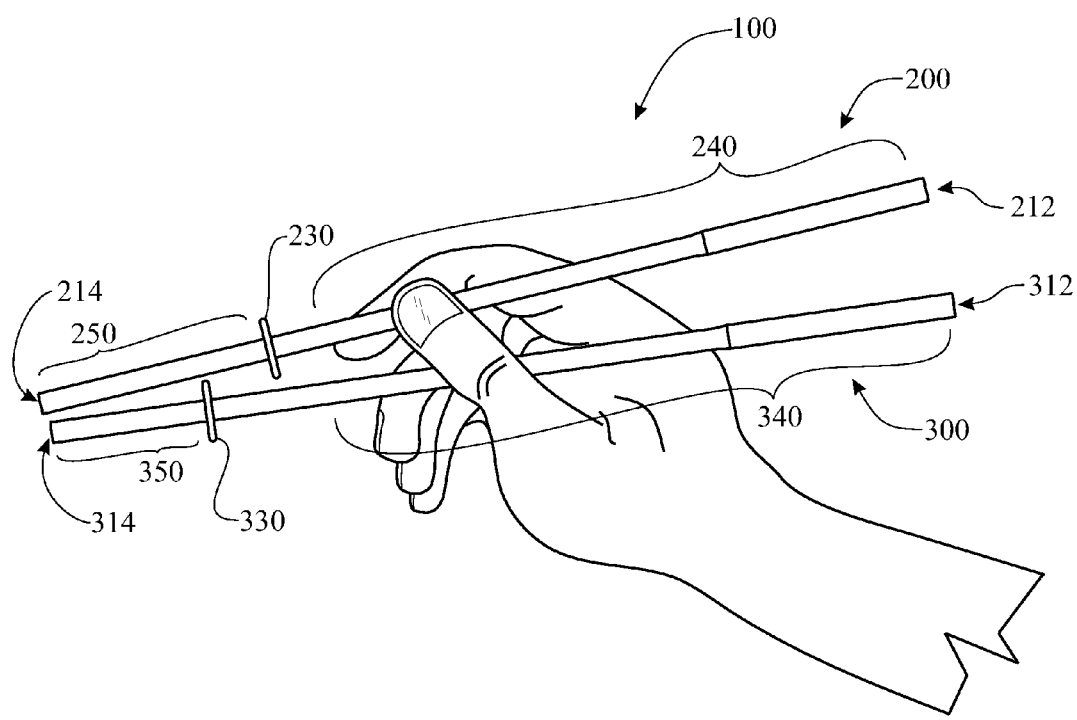
FIG. 5 presents a schematic view of the pair of chopsticks of FIG. 1, being held by a user's hand in an exemplary eating position.

The illustrations of FIGS. 3 and 4 present a side elevation view and front elevation view, respectively, of the pair of chopsticks 100 of FIG. 1, in a situation in which the pair of chopsticks is set to rest on a horizontal surface 400. The chopsticks 200, 300 have been set side-by-side to one another, as one would normally place them on a table during a meal or when setting the table. As can be seen in the figures, when the chopsticks 200, 300 are arranged to rest on surface 400, due to the effect of gravity the chopstick elongated body is automatically arranged so that the proximal ends 212, 312 and the chopstick protruding elements 230, 330 contact the surface 400, whereas the chopstick elongated body distal ends 214, 314 remain elevated from the horizontal surface 400, i.e. remain at a certain vertical distance from the horizontal surface 400. Thus, the respective portions of the elongated bodies extending from the corresponding protruding elements 230, 330 to the corresponding elongated body distal ends 214, 314 remain at a significant distance from the horizontal surface 400 and are prevented from becoming contaminated by contact with surface 400. In consequence, the chopsticks 200, 300 in accordance with the invention can be conveniently used, as shown in FIG. 5, by holding the chopsticks 200, 300 along a respective gripping portion 240, 340 arranged between the protruding elements 230, 330 and the corresponding elongated body proximal ends 212, 312 (exemplary gripping portions 240, 340 being indicated in FIGS. 1 through 3), and by seizing food with corresponding opposed eating portions 250, 350, arranged between the protruding elements 230, 330 and the corresponding elongated body distal ends 214, 314. In other words, the chopstick eating portion 250, 350 shall be a portion of the elongated body 210, 310 arranged between the corresponding protruding element 230, 330 and the elongated body end that is closest to the protruding element 230, 330 (i.e., the corresponding distal end 214, 314), whereas the chopstick gripping portion 240, 340 shall be a portion of the elongated body arranged between the corresponding protruding element 230, 330 and the elongated body end that is farthest from the protruding element 230, 330 (i.e., the corresponding proximal end 212, 312). As such, the eating portions 250, 350 will remain uncontaminated prior to and during a meal, without requiring the use of auxiliary chopstick rests.

Preferably, as shown in FIGS. 1 and 4, the protruding elements 230, 330 are arranged around a perimeter of the corresponding elongated body exterior surfaces 216, 316, i.e., extending around the corresponding longitudinal axis 220, 320 in a 360-degree configuration. Such an arrangement allows the chopstick distal ends 214, 314 to be elevated from surface 400 regardless of the rotational position relative to longitudinal axes 220, 320 in which the user sets the chopsticks 200, 300 to rest on the surface 400. Thus, the user may rest assured that whatever the rotational position of the chopsticks 200, 300, the distal ends 214, 314 will always remain clean and uncontaminated.

In the present embodiment, in particular, the protruding elements 230, 330 are rotationally symmetrical relative to the corresponding elongated body longitudinal axis 220, 320. In consequence, the chopstick 200, 300 can slightly roll around the protruding elements 230, 330 when resting on the surface 400, as best understood in FIG. 4. Such a rolling ability facilitates making minor corrections in the relative position of the chopsticks 200, 300 when placed on a table or horizontal surface 400, in order to place the chopsticks 200, 300 in perfect parallel arrangement, and therefore contributes to set a table in a tidy manner.

In addition, as best shown in FIG. 2, the first chopstick protruding element 230 is arranged at a first distance from said first chopstick elongated body distal end 214. In turn, the second chopstick protruding element 330 is arranged at a second distance from said second chopstick elongated body distal end 314. In certain embodiments, such as that of the figures enclosed herein, the first distance is greater than the second distance; i.e., the chopstick protruding elements 230, 330 are not equally distant from their respective elongated body distal ends 214, 314. Such an arrangement is advantageous in that, when the user places the chopsticks 200, 300 side by side to one another, the chopsticks 200, 300 can be brought relatively close to one another as the protruding elements 230, 330 are placed at different longitudinal positions and thus do not contact each other. Thus, when the chopsticks 200, 300 are set on a surface 400 as shown in FIGS. 3 and 4, they can be set very close to each other (as best shown in FIG. 4), separated only by a distance equal to the transverse protruding distance of the protruding elements 230 with respect to the corresponding elongated body exterior surface 216, 316. In addition, when the user holds the chopsticks 200, 300 as shown in FIG. 5, the protruding elements 230, 330 do not interfere with one another and allow the user to operate comfortably with the chopsticks 200, 300.

The protruding elements 230, 330 depicted in the drawings are disc-shaped collars arranged concentric to the respective elongated body longitudinal axes 220, 320. Having the protruding elements 230, 330 in the form of discs minimizes the longitudinal dimension of the protruding elements 230, 330 and maximizes the length of eating portions 250, 350 and gripping portions 240, 340, therefore causing minimal interference with normal operation of the chopsticks 200, 300 and minimizing the amount of material required to manufacture the chopsticks 200, 300 in accordance with the invention.

The protruding elements 230, 330 preferably have a radial dimension that is greater than a maximum radial dimension of the elongated body 210, 310. For instance, as best shown in FIG. 2, the diameter of the disc-shaped protruding elements 230, 330 is greater than the maximum width of the corresponding elongated bodies 210, 310. In consequence, as shown in FIG. 3, the eating portions 250, 350 are sloped upwards and away from surface 400, in order to maximize the clearance between the elongated body distal ends 214, 314 and the surface 400, and thus to minimize the risk of contaminating the eating portions 250, 350.

In addition, each protruding element 230, 330 of the present embodiment is integrally formed with the corresponding elongated body 210, 310, thus allowing the chopstick 200, 300 to be manufactured as a single piece. Eating, washing, storing and transporting of the chopsticks 200, 300 is thereby simplified. In addition, the manufacture cost is kept to a minimum, resulting in a more affordable product.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A manufactured article comprising:
   two chopsticks, each chopstick having
      an elongated body arranged along a longitudinal axis, said body comprising a proximal end, a distal end and an exterior surface; and
      a protruding element, integrally formed with said elongated body and protruding radially from said elongated body exterior surface, said protruding element being arranged closer to said elongated body distal end than to said elongated body proximal end, wherein a distal end surface of said protruding element is arranged at a first distance from said elongated body distal end, and a proximal end surface of said protruding element is arranged at a second distance from said elongated body proximal end, wherein
   the first distance of one of said two chopsticks is greater than the first distance of the other of said two chopsticks, and the second distance of said one of said two chopsticks is less than the second distance of said other of said two chopsticks.

2. The manufactured article of claim 1, wherein said chopstick protruding element is arranged around a perimeter of said chopstick elongated body exterior surface.

3. The manufactured article of claim 2, wherein said chopstick protruding element is rotationally symmetrical relative to said chopstick elongated body longitudinal axis.

4. The manufactured article of claim 3, wherein said chopstick protruding element is a disc-shaped collar concentric to said chopstick elongated body longitudinal axis.

5. The manufactured article of claim 4, wherein said chopstick protruding element has a radial dimension that is greater than a maximum radial dimension of the chopstick elongated body.

6. A pair of chopsticks, comprising:
   a first chopstick and a second chopstick, each comprising
      an elongated body arranged along a longitudinal axis, said body comprising a proximal end, a distal end and an exterior surface; and
      a protruding element, integrally formed with said elongated body and protruding radially from said elongated body exterior surface, said protruding element being arranged closer to said elongated body distal end than to said elongated body proximal end, wherein a distal end surface of said protruding element is arranged at a first distance from said elongated body distal end, and a proximal end surface of said protruding element is arranged at a second distance from said elongated body proximal end, wherein
   the first distance of the first chopstick is greater than the first distance of the second chopstick, and the second distance of the first chopstick is less than the second distance of the second chopstick.

7. The pair of chopsticks of claim 6, wherein the first chopstick protruding element and second chopstick protruding element present the same shape and size.

8. The pair of chopsticks of claim 6, wherein each protruding element is arranged around a perimeter of the corresponding elongated body exterior surface.

9. The pair of chopsticks of claim 8, wherein each protruding element is rotationally symmetrical relative to the corresponding elongated body longitudinal axis.

10. The pair of chopsticks of claim 9, wherein the protruding elements are disc-shaped collars concentric to each respective elongated body longitudinal axis.

11. The pair of chopsticks of claim 10, wherein each protruding element has a radial dimension that is greater than a maximum radial dimension of the respective elongated body.

12. A manufactured article comprising:
    two chopsticks, each chopstick having
        an elongated body arranged along a longitudinal axis, said body comprising a proximal end, a distal end and an exterior surface; and
        a corresponding protruding element, integrally formed with said elongated body and protruding radially from said elongated body exterior surface, said protruding element being arranged closer to said elongated body distal end than to said elongated body proximal end, wherein a distal end surface of said protruding element is arranged at a first distance from said elongated body distal end, and a proximal end surface of said protruding element is arranged at a second distance from said elongated body proximal end, wherein
    said two chopsticks can adopt a relative position in which said two chopsticks are arranged adjacent and parallel to one another with said distal ends transversely aligned, and in which the entire protruding element of one chopstick of said two chopsticks is arranged forwardly to the protruding element of the other chopstick of said two chopsticks.

13. The manufactured article of claim 12, wherein the protruding elements of said two chopsticks present the same shape and size.

14. The manufactured article of claim 12, wherein each protruding element is arranged around a perimeter of the exterior surface of the corresponding elongated body.

15. The manufactured article of claim 14, wherein each protruding element is rotationally symmetrical relative to the longitudinal axis of the corresponding elongated body.

16. The manufactured article of claim 15, wherein each protruding element is a disc-shaped collar concentric to the longitudinal axis of each corresponding elongated body.

* * * * *